United States Patent
Schultz

(10) Patent No.: US 8,337,122 B2
(45) Date of Patent: Dec. 25, 2012

(54) CONTINUOUS SEMI-DENSE PNEUMATIC CONVEYING SYSTEM AND METHOD

(75) Inventor: Brad Schultz, Kansas City, KS (US)

(73) Assignee: Magnum Systems, Inc., Kansas City, KS (US)

(*) Notice: Subject to any disclaimer, the term of this patent is extended or adjusted under 35 U.S.C. 154(b) by 263 days.

(21) Appl. No.: 12/614,863

(22) Filed: Nov. 9, 2009

(65) Prior Publication Data

US 2011/0110729 A1 May 12, 2011

(51) Int. Cl.
*B65G 53/12* (2006.01)

(52) U.S. Cl. ............ 406/146; 406/14; 406/15; 406/67; 406/137

(58) Field of Classification Search .......... 406/52, 406/63–68, 14, 15, 137, 144, 146
See application file for complete search history.

(56) References Cited

U.S. PATENT DOCUMENTS

| | | | |
|---|---|---|---|
| 1,755,329 A | 4/1930 | McCormack | |
| 1,889,163 A | 11/1932 | Vogel-Jorgensen | |
| 2,500,271 A | 3/1950 | Bozich | |
| 3,291,536 A * | 12/1966 | Smoot | 406/14 |
| 3,365,242 A | 1/1968 | Marchetti | |
| 3,413,039 A * | 11/1968 | Asgeirsson | 406/24 |
| 3,437,384 A | 4/1969 | Bozich | |
| 4,662,799 A | 5/1987 | Paul et al. | |
| 4,705,433 A * | 11/1987 | Brannstrom | 406/63 |
| 4,775,267 A | 10/1988 | Yamamoto | |
| 4,863,316 A | 9/1989 | Gianella et al. | |
| 4,883,390 A | 11/1989 | Reintjes et al. | |
| 5,407,305 A | 4/1995 | Wallace | |
| 5,480,268 A | 1/1996 | Smoot | |
| 5,494,381 A | 2/1996 | Heyl et al. | |
| 5,722,801 A | 3/1998 | Mahoney, Jr. | |
| 5,813,801 A | 9/1998 | Newbolt et al. | |
| 5,967,429 A | 10/1999 | Ulfik et al. | |
| 6,012,875 A | 1/2000 | Goettelmann et al. | |
| 2008/0124179 A1 | 5/2008 | Fleckten et al. | |
| 2010/0040421 A1 * | 2/2010 | Fleckten et al. | 406/39 |

* cited by examiner

*Primary Examiner* — Joseph A Dillon, Jr.
(74) *Attorney, Agent, or Firm* — Stinson Morrison Hecker LLP

(57) ABSTRACT

A continuous semi-dense phase conveying system comprising a vessel having a gas inlet, a particulate material inlet, and a gas and particulate material outlet, which has an operating pressure of about 15 psig or less. The system includes a rotary airlock valve for feeding particulate material into the vessel and a pressurizing gas supply which branches into a feed gas line and a bypass line. A pneumatic conveying line coupled to the gas and particulate material outlet of said the and coupled to the bypass line. The pressure of the vessel is controlled using a bypass valve on said bypass line and optimize the flow of gas and particulate matter through the pneumatic conveying line.

13 Claims, 1 Drawing Sheet

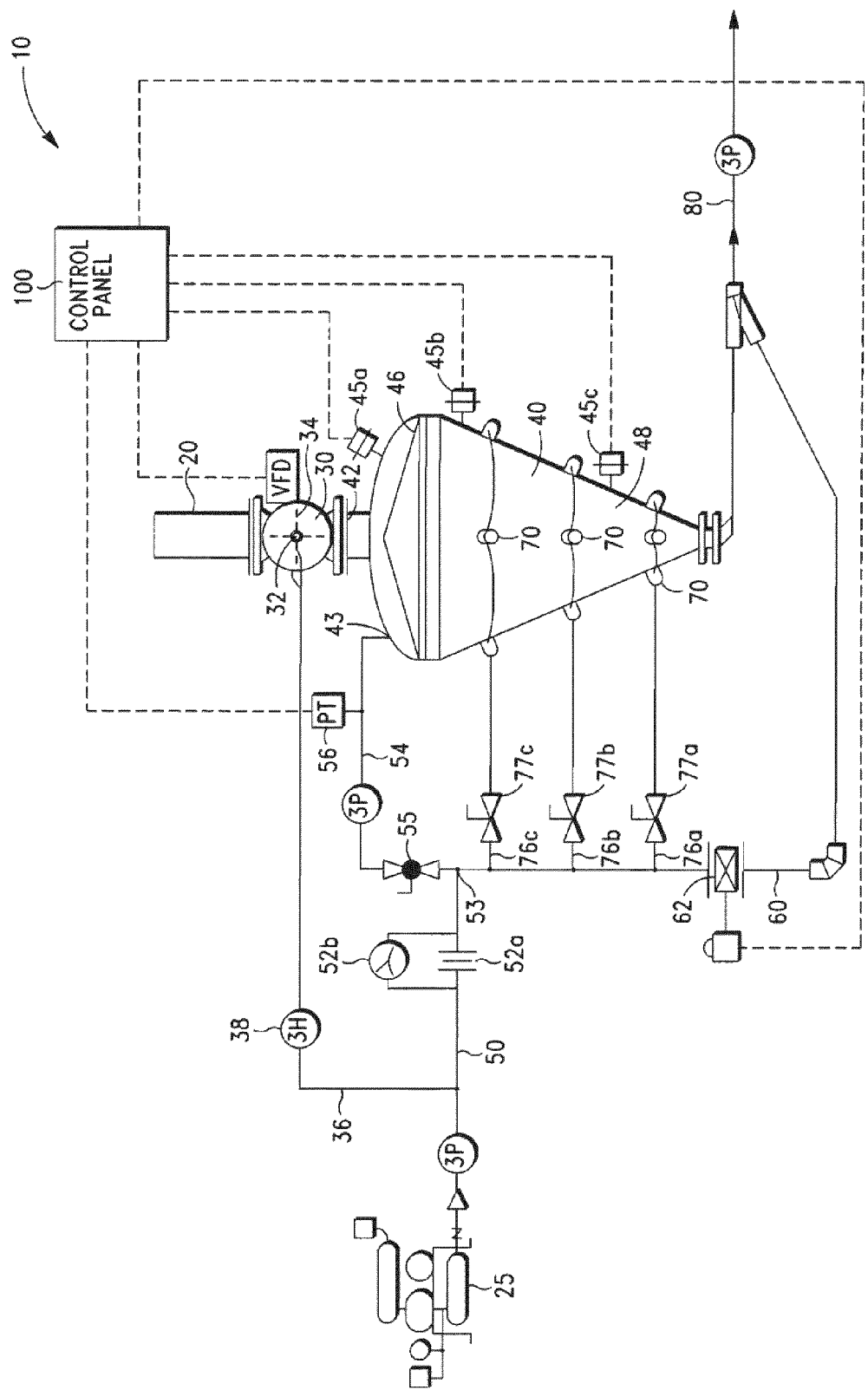

CONTINUOUS SEMI-DENSE PNEUMATIC CONVEYING SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a conveying method and apparatus for conveying large quantities of dry bulk materials through a material conveying pipe.

2. Description of Related Art

Pneumatic conveying systems are designed to move large quantities of particulate material in an air (or other inert gas) medium through a material conveying pipe. Pneumatic conveying systems are of two general types: dilute phase systems and dense phase systems. Typically, the type of the particulate material to be conveyed determines what type of pneumatic conveying system to utilize.

In dilute phase conveying systems, particulate material is metered into the conveying pipe from a hopper or other holding device. A standard blower delivers a high volume of air (or inert gas) at a low pressure, typically not exceeding 15 psig, that is used to convey a low volume of particulate material. The stream travels at high velocities, typically between 4,000 to 6,500 ft/min, in order to keep the light particulate product load in suspension in the flowing gas stream. In dilute phase conveying systems, the particulate material being conveyed is usually very free flowing, and the solids loadings is relatively low, typically on the order of 5 to 15 pounds of particulate material per pound of gas. In general, dilute phase systems are typically used to convey non-abrasive and non-fragile materials that have low densities, such as flour, potato starch, cornstarch, calcium carbonate, hydrated lime, activated carbon, and zinc oxide.

Dense phase conveying systems are generally characterized by lower inert gas velocities and much higher conveying pressures operating in a batch mode. Dense phase conveying systems are typically used to convey abrasive and/or friable material, such as silica sand, fly ash, alumina, carbon black, cocao beans, hazel nuts, corn, plastic pellets, and puffed rice. In such systems, a containment vessel is filled (typically by gravity feed) with the particulate material, sealed, and then pressurized to the desired high pressure. Subsequent release of the pressure discharges the material and propels it along the conveying pipe to its intended destination. The stream travel at velocity typically between 1000 and 3000 ft/min, and the conveying pressure may be as high as 60 psig. In contrast to dilute phase conveying systems, dense phase conveying systems utilize higher ratios of particulate material to the amount of gas used and thus have higher solids loading. Because air compressors and ASME code equipment must be used in order to achieve and withstand the high conveying pressures, dense phase systems have dramatically increases the capital and operating cost of the system compared to that of dilute phase systems.

Dense phase conveying systems suffer from other drawbacks. In dense phase conveying systems, the pressure containment vessel must be closed and the pressurized gas vented off before the pressure containment vessel can be recharged for the next batch of particulate material to be conveyed. Alternatively, the pressure containment vessel is returned to the necessary lower pressure for refilling by letting the high pressure air (or inert gas) dissipate down the material conveying line. The foregoing dense phase conveying system is typically referred to as a "batch" dense phase conveying system. Thus, a major disadvantage associated with batch dense phase conveying systems is that there is a significant amount of non-product conveying time involved while the pressure containment vessel is venting, being refilled, and pressurized. Typically, the system is only operating about 60% of the time. Another disadvantage is that, because of the significant amount of non-conveying time, the conveying pipe size must be relatively large to compensate for the lost time. Another disadvantage is that the last portions of the particulate material leaving the pressure containment vessel tend to accelerate rapidly as the material conveying pipe is blown free and the high pressure gas seeks to dissipate down along the material conveying pipe. The increased acceleration of the particulate material being conveyed often causes a significant amount of product degradation to the last portion of the particulate material being conveyed.

So-called semi-dense phase conveying systems or "blow pot" systems are also known in the art. In general, these conveying systems are a combination of dense phase and dilute phase systems. The blow-pot system has high solids loadings and operates in a batch mode like dense phase systems. Because the lower pressures are utilized, the equipment does not need to meet ASME code requirements and generally utilizes gas blowers instead of air compressors like the dilute phase systems. However, blow-pot systems still run in batch mode and have significant non-conveying time.

More recently, continuous dense phase conveying methods have been proposed, such as those described in Wallace, U.S. Pat. No. 5,407,305. In general, a high pressure rotary airlock valve is utilized to feed the particulate material into the conveying pipe using high pressure gas, typically on the order of 45 to 60 psig. Because of the high pressures used to move material, the equipment utilized must meet ASME code requirements, and air compressors must be utilized, resulting in high capital costs.

BRIEF SUMMARY OF THE INVENTION

The present invention is directed to a continuous semi-dense phase conveying system which has a high solids loading, lower air velocities, and low capital costs. In general, the continuous semi-dense phase conveying system comprises a vessel having a gas inlet, a particulate material inlet, and a gas and particulate material outlet. The vessel has a pressure therein during operation of about 15 psig or less. A rotary airlock valve is coupled to the particulate material inlet for continuously feeding particulate material into the particulate material inlet of the vessel. A pressurizing gas supply line is coupled to a pressurized gas source and branches into at least a feed gas line and a bypass line. The feed gas line provides pressurizing gas to the vessel at the gas inlet, and the bypass line has a bypass control valve and is coupled to the pneumatic conveying line, which is coupled to the gas and particulate material outlet of the vessel. Fluidizing gas lines may be coupled to the bypass line.

In one aspect, the rotary airlock valve comprises a pair of fixed end plates, a rotable shaft, and a plurality of extending vanes attached to the shaft. A purge gas supply line may be coupled to rotary airlock valve from the pressurizing gas supply line.

In a further aspect, the pressurized gas source comprises a blower which provides gas having a velocity of about 800 to 4000 ft/min to the pressurizing gas supply line. In still another aspect, the pressurizing gas line includes a purge air control orifice and cavity air purge gauge for controlling the volume and pressure on the air lock cavity air purge.

The performance of the system can be demonstrated using one or more test materials. As demonstrated in the examples below, the semi-dense phase conveying system of the present invention was able to achieve very high particulate material loading using low air velocities and low air pressures at a low capital and operating costs. In general, the solids loadings of the semi-dense phase conveying system were much higher than the dilute phase system, and in many instances the solids loadings were comparable to those of a traditional dense phase systems. Moreover, the efficiencies (lb/HP) of the semi-dense phase conveying system of the present invention were much higher compared to a dense phase system without the necessity of increased capital costs required for ASME-code equipment. For example, in one aspect, the inventive system has an efficiency of 22 or more pounds of particulate material per horsepower used to power the pressurizing gas source (the comparable dilute phase system had an efficiency of about 9 lb/HP and the comparable dense phase system had an efficiency of about 10 lb/HP) and a loading of at least 65 pounds of particulate material per pound (the comparable dilute phase system had an efficiency of about 11 lb/lb and the comparable dense phase system had an efficiency of about 98 lb/lb) of pressurizing gas when bentonite clay is used as a test particulate material moving through 260 feet of pipe as a test conveying line. As another example, the inventive system has an efficiency of 11 or more pounds of particulate material per horsepower used to power the pressurizing gas source (the comparable dilute phase system had an efficiency of about 7 lb/HP and the comparable dense phase system had an efficiency of about 10 lb/HP) and a loading of at least 23 pounds of particulate material per pound (the comparable dilute phase system had an efficiency of about 11 lb/lb and the comparable dense phase system had an efficiency of about 100 lb/lb) of pressurizing gas when gypsum is used as a test particulate material moving through 260 feet of pipe as a test conveying line. As yet another example, the inventive system has an efficiency of 12 or more pounds of particulate material per horsepower used to power the pressurizing gas source (the comparable dilute phase system had an efficiency of about 11 lb/HP and the comparable dense phase system tests could not even be performed because the high-pressure test systems were unstable) and a loading of at least 32 pounds of particulate material per pound (the comparable dilute system was at 12 lb/lb) of pressurizing gas when fly ash is used as a test particulate material moving through 260 feet of pipe as a test conveying line. And in another example, the inventive system has an efficiency of 10 or more pounds of particulate material per horsepower used to power the pressurizing gas source the comparable dilute phase system had an efficiency of about 7 lb/HP and the comparable dense phase system had an efficiency of about 5 lb/lb) and a loading of at least 24 pounds of particulate material per pound (the comparable dilute phase system had an efficiency of about 10 lb/lb and the comparable dense phase system had an efficiency of about 52 lb/lb) of pressurizing gas when a 325-mesh limestone is used as a test particulate material moving through 260 feet of pipe as a test conveying line. In still another example, the inventive system has an efficiency of 14 or more pounds of particulate material per horsepower used to power the pressurizing gas source the comparable dilute phase system had an efficiency of about 5 lb/HP and the comparable dense phase system had an efficiency of about 5 lb/lb) and a loading of at least 37 pounds of particulate material per pound (the comparable dilute phase system had an efficiency of about 7 lb/lb and the comparable dense phase system had an efficiency of about 94 lb/lb) of pressurizing gas when a 200-mesh limestone is used as a test particulate material moving through 260 feet of pipe as a test conveying line.

The performance of the system can be demonstrated using one or more test materials. As demonstrated in the examples below, the semi-dense phase conveying system of the present invention was able to achieve very high particulate material loading using low air velocities and low air pressures at a low capital and operating costs. In general, the solids loadings of the semi-dense phase conveying system were much higher than the dilute phase system, and in many instances the solids loadings were comparable to those of a traditional dense phase systems. Moreover, the efficiencies (lbs/HP) of the that the semi-dense phase conveying system of the present invention were much higher compared to a dense phase system without the necessity of increased capital costs required for ASME-code equipment. For example, in one aspect, the inventive system an efficiency of 22 or more pounds of particulate material per horsepower used to power the pressurizing gas source and a loading of at least 65 pounds of particulate material per pound of pressurizing gas when bentonite clay is used as a test particulate material moving through 260 feet of pipe as a test conveying line. As another example, the inventive system has an efficiency of 23 or more pounds of particulate material per horsepower used to power the pressurizing gas source and a loading of at least 11 pounds of particulate material per pound of pressurizing gas when gypsum is used as a test particulate material moving through 260 feet of pipe as a test conveying line. As yet another example, the inventive system has an efficiency of 13 or more pounds of particulate material per horsepower used to power the pressurizing gas source and a loading of at least 32 pounds of particulate material per pound of pressurizing gas when fly ash is used as a test particulate material moving through 260 feet of pipe as a test conveying line. And in another example, the inventive system has an efficiency of 14 or more pounds of particulate material per horsepower used to power the pressurizing gas source and a loading of at least 37 pounds of particulate material per pound of pressurizing gas when a 200-mesh limestone is used as a test particulate material moving through 260 feet of pipe as a test conveying line.

In another aspect, the feed gas line has a pressure transmitter which transmits a pressure signal to a controller which sends an output signal to control the gas flow through bypass control valve of the bypass line.

The present invention is also directed to a method for conveying particulate material through a pneumatic conveying line. The method comprises continuously feeding particulate material from a feed source through a rotary airlock valve into a vessel having a gas inlet, a particulate material inlet, and a gas and particulate material outlet. The vessel has a pressure therein during operation of about 15 psig or less. At the same time, gas is continuously supplied into a pressurizing gas supply line which branches into at least one feed gas line at least one bypass line. The feed gas line provides pressurizing gas to the vessel at the gas inlet to form a gas and particulate material mixture. The bypass line has a bypass control valve and is coupled to the pneumatic conveying line. Gas and particulate material mixture to continuously flow into the pneumatic conveying line at the gas and particulate material outlet of the vessel.

In another aspect, the inventive method comprises the step of monitoring the pressure of the vessel and changing the flow of gas through the bypass line to the pneumatic conveying line to maintain the pressure in the vessel at a predetermined pressure.

In still another aspect, the inventive method includes a feed gas line with a pressure transmitter which is coupled to a controller which controls the gas flow through the bypass control valve of the bypass line. The method includes the step of providing a control signal to the bypass control valve from the controller to control the flow of gas through the bypass line. In another aspect, the pressurizing gas line has a pressure transmitter which is coupled to a controller which controls the gas flow through the bypass control valve of the bypass line. The method includes the step of providing a control signal to the bypass control valve from the controller to control the flow of gas through the bypass line. In yet another aspect, the purge gas line gas line has a pressure transmitter which is coupled to a controller which controls the gas flow through the bypass control valve of the bypass line. The method includes the step of providing a control signal to the bypass control valve from the controller to control the flow of gas through the bypass line.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 1 is a schematic view of a continuous semi-dense pneumatic conveying system in accordance with the present invention.

DETAILED DESCRIPTION OF PREFERRED EMBODIMENT

With reference to FIG. 1, a continuous semi-dense phase conveying system of the present invention is denoted generally by the reference numeral 10. System 10 includes a particulate product source 20, such as a hopper or bin for storing the particulate material. It is anticipated that nearly any material that can be conveyed in a traditional dense phase system will be suitable for use in the continuous semi-dense phase conveying system of the present invention. However, it is believed that the present invention is best suited for use with fluidizable powders. In general, these powders are about 200-mesh or smaller, but also have a uniform particle size. For example, the average particle size is about 75, 70, 65, 60, 55, 50, 45, 40, 35, 30, or 25 microns or less, or some range therebetween. Typically, about 60 to 80% of the material falls within a particle size of 2 or less standard deviations using a sieve analysis stack-up, which comprises 16-, 30-, 50-, 100-, 200-, and 450-mesh screens.

Particulate material from the product source 20 is fed into a vessel 40 at a particulate material inlet 42 using a low pressure rotary airlock valve 30. The rotary airlock valve 30 has a central rotable shaft 32 and a plurality of outwardly extending vanes 34. The rotary airlock valve 30 is attached to and is in fluid communication with a blow pot vessel 40. The rotary airlock valve 30 receives product under substantially atmospheric pressure and exits the rotary airlock valve 30 at a pressure in the vessel 40 greater than atmospheric pressure, typically about 15 psig or less, and is preferably about 10, 11, 12, 13, 14, or 15 psig, or some range therebetween. The extending vanes 34 act as a plurality of revolving doors for separating one pressurized area (vessel 40) from another non-pressurized area (product source 20). The rotary airlock valve 30 may optionally include purge gas line 36 and hand valve 38, which pressurizes the endplates of the rotary airlock valve 30 to keep the product material from being lodged between the endplate and the rotor as generally set forth in Smoot, U.S. Pat. No. 5,480,268, which is incorporated by reference in its entirety.

The vessel 40 has an upper section 46 and a lower inverted conical section 48. A gas inlet 43 is preferably located in the upper section 46 of the vessel. The gas inlet 43 is coupled to and is in fluid communicating with a pressurizing gas supply line 50, which receives air (or other inert gas) from a blower 25. The blower 25 used in the present invention typically provides about 0 to 500 ft$^3$/min of gas to the system using a variable frequency drive ("VFD") controller on the blower motor, giving a full range of variable flow for the system. Thus, gas flow of 50, 100, 150, 200, 250, 300, 350, 400, 450, or 500 ft$^2$/min (or some range therebetween) may be delivered to the system 10.

As shown FIG. 1, the pressurizing gas supply line 50 optionally includes a cavity purge air control orifice 52a and associated cavity air purge gauge 52b in order to control the back pressure along the pressurizing gas line 50 such that the upstream pressure is slightly higher than the downstream pressure. This also provides a higher pressure in the purge gas line 36 and rotary air lock valve 30. A butterfly valve (not shown) may be optionally incorporated into pressurizing gas line 50 in order to control the back pressure (see Example 1). The pressurizing gas supply line 50 branches at tee 53 into a feed gas line 54 and a bypass line 60.

The feed gas line 54 has an air control valve 55, such as a globe valve or butterfly valve, for controlling the airflow entering the vessel 40 at the gas inlet 43. The feed gas line 54 includes a pressure transmitter 56 which is coupled to controller 100. Controller 100 may be any conventional programmable computer with an input/output interface capable of handling analog or digital sensor inputs and providing analog or digital sensor outputs. Programming methods and techniques for such commercially available controllers are well known in the art. The controller includes a processor and user interface. User interface preferably includes a conventional keypad or keyboard and display. Processor receives input from the pressure transmitter 56 and provides output to a transducer which controls the gas flow through a bypass line 60 as discussed more fully below.

Although pressure transmitter 56 is located in feed gas line 54 in FIG. 1, it will be appreciated that the pressure transmitter essentially provides a pressure measurement for vessel 40 because feed gas line 54 is in fluid communication with feed gas line 54. It will be appreciated that the pressure of vessel 40 may optionally measure by measuring the pressure in pressurizing gas line 50 (adjusted somewhat if air control orifice 52a is used), purge gas line 36, or at the particulate material inlet 42. In each case, the processor would receive input from the pressure transmitter 56 and provide output to a transducer which controls the gas flow through a bypass line 60 as discussed more fully below. The system is designed so that the pressure in the vessel 40 (as estimated by measuring pressure in the feed gas line 54, the pressurizing gas line 50, the purge gas line 36, and/or the particulate material inlet 42) is typically about 15 psig or less, and is preferably about 10, 11, 12, 13, 14, or 15 psig, or some range therebetween.

As shown in FIG. 1, the gas flow into, the gas distribution within, and the gas pressure of the vessel 40, is also controlled by one or more optional fluidizing gas lines 76a, 76b, 76c. Airflow is independently controlled by corresponding valves 77a, 77b, 77c, such as ball valves, for controlling the gas entering the vessel at various fluidizing inlets 70. The number of fluidizing inlets 70 associated with each fluidizing line 76 may vary, but is typically on the range of about 1 to 15, more preferably about 3 to 10 fluidizing inlets. While FIG. 1 illustrates three fluidizing gas lines 76, it will be appreciated that the number and location of fluidizing gas lines 76 and/or fluidizing inlets 70 may vary depending upon the amount and type of particulate material being conveyed. Further, it is anticipated that one or more of the feed gas line 54 or fluidizing gas lines 76 may be completely closed during operation, depending on the amount and type of particulate material being conveyed. For example, in one aspect, the vessel 40 may be pressurized using the bottom two fluidizing gas lines 76a, 76b while valve 55 and valve 76c are closed. In general, as more gas flows through the upper portion 46 of the vessel 40, the more particulate material is pushed into the conveying line 80. In general, the balance between fluidizing gas lines 76a, 76b, 76c and the gas entering the top of the vessel through gas inlet 43 controls how fluidized the material becomes in the vessel 40 and in the conveying line 80. It will be appreciated that some materials can be "overfluidized" and the efficiency of the system will decrease in such circumstances.

As discussed above, the pressurizing gas supply line 50 branches into a feed gas line 54 and a bypass line 60, which ultimately joins into conveying line 80. Bypass line 60 includes a control valve 62, preferably a butterfly valve, that receives output from the controller 100. Pressure transmitter 56 in the feed gas line 54 provides an input pressure signal to the controller 100, and in response thereto, the controller 100 provides an output signal to control the degree to which the bypass control valve 62 is opened. For example, if the operator desires for the vessel 40 to operate at a pressure of 15 psig, then the bypass control valve 62 is adjusted accordingly in order to achieve the desired pressure.

The vessel 40 is also equipped with one or more level indicators 45a, 45b, 45c. The level indicators measure of the amount of particulate material in the vessel and provide a corresponding signal to the controller 100. The controller 100 then provides an output signal to control the degree to which the rotary airlock valve 20 meters particulate material to the vessel 40. FIG. 1 illustrates three level indicators 45 to measure high, middle, and low levels of particulate material in the vessel, but it will be appreciated to those skilled in the art that the number and location of level indicators may vary depending upon the quantity of particulate material, type of particulate material, and overall particulate material flow desired by the operator.

The conveying pressure through the pneumatic conveying line 80 of the system is about 15 psig or less, and is preferably about 10, 11, 12, 13, 14, or 15 psig, or some range therebetween. The velocity of the gas flowing though the pneumatic conveying line is typically about 800 to 4000 ft/min. For example, velocities of 800, 900, 1000, 1100, 1200, 1300, 1400, 1500, 1600, 1700, 1800, 1900, 2000, 2100, 2200, 2300, 2400, 2500, 2600, 2700, 2800, 3000, 3100, 3200, 3300, 3400, 3500, 3600, 3700, 3800, 3900, and 4000 ft/min (or some range therebetween) are contemplated.

The following examples are offered to illustrate the invention, and are not to be construed in any way as limiting the scope of the invention.

EXAMPLE 1

In this example, the continuous semi-dense phase conveying system of the present invention was compared to a continuous dilute phase system and a batch dense phase system. For all of the systems, the conveying line comprised 260 feet of 3-inch tube or pipe with seven 90-degree 36-inch centerline radius elbows followed by four Smoot 3-inch tube slide diverters (Magnum Systems, Kansas City, Kans.) with approximately three feet of 688SB flexible material handling hose (Gates Corporation, Denver, Colo.) per slide diverter. The continuous semi-dense phase conveying system of the present invention and the dilute phase system were comprised of 3-inch aluminum tubing (2.76 ID), while the batch dense phase system was comprised of 3-inch ASME-code carbon steel pipe (3.05 ID).

For the continuous semi-dense conveying system, particulate material is loaded into a 24 $ft^3$/day scale hopper with an Advantage Lite load cells at 0, 120, and 240 degrees mounted to the floor (Hardy Instruments, San Diego, Calif.). The material is fed into a Smoot FT16 type 2 rotary feeder (Magnum Systems, Kansas City, Kans.) with a low pressure cavity air purge attached to a 9-$ft^3$ non-ASME code blow-pot. The blow-pot is equipped with three (low, middle, and high) level indicators (Ametek-Drexelbrook, Horsham, Pa.) that control the VFD of the FT16 type 2 rotary feeder. To help fluidize the contents of the vessel, truck-style air pads (Solimar Pneumatics, Minneapolis, Minn.) are mounted on vessel using 1.5-inch hose connections in rows of three, where each row is controlled by a ball valve.

For the continuous semi-dense phase system, ambient air enters about 30 feet of four-inch 11-gauge carbon steel tube to the inlet of a 30 HP 310 $ft^3$/min blower with a PneuMax 6008 rotary pressure pump (Tuthill, Springfield, Mo.). The carbon steel tube on the intake of the blower includes a four-inch calibrated velocity meter (Rosemount Inc., Chanhassen, Minn.). The positive-displacement blower discharge also includes a 0 to 30 psig pressure transmitter. Data from the air velocity flow meter and pressure transmitter is sent to the CompactLogix 1769 L35E programmable logic processor ("PLC") and Rockwell Software's RSLogix 5000 Enterprise edition, (Rockwell Automation, Inc.) which receives and transmits various analog and digital signals to control the various components of the pneumatic system. The blower air flow is controlled by an Allen Bradley Flex 40 VFD. It will be appreciated to those skilled in the art that the air flow from the blower may operate at a fixed feed, which is typical in the commercial setting. Thus, while in this example the VFD controls both the blower and the rotary airlock feeder, it will be appreciated that the VFD may only control the rotary airlock feeder when using the inventive system in a commercial setting.

Once air enters the blower, it is pressurized and pushed through about 30 feet of 3-inch aluminum air tubing through a manual butterfly valve to control the amount of air that enters into the low-pressure cavity air purge manifold of the FT16 rotary airlock feeder. It will be appreciated to those skilled in the art that the butterfly valve operates as a means for controlling the backpressure in the pressurizing gas line. Downstream from butterfly valve, the air flows into a tee, where it meets another adjustable valve, such as a butterfly valve, that either directs the air to enter at the vessel at a feed gas inlet or through the Solimar air pads (fluidizers) on the vessel. Still another butterfly valve (bypass valve) having a 4-20 mA control module is positioned below and downstream from the fluidizers. The PLC controls the amount of airflow that is bypassed around the vessel using this downstream butterfly valve.

As material is fed from the weigh hopper into the vessel, material transfer into the conveying pipe does not begin until a low level has been reached in the vessel (as indicated by the low level indicator). Once the low level is reached, the bypass valve is opened and set to a degree so that material starts to convey from the bottom material/gas discharge of the vessel. The degree to which the bypass valve is open depends on the type of material and to what extent the vessel is pressurized. The bypass valve remains constant until the desired pressure is reached, and then the bypass valve acts as a pressure control valve, fluctuating to keep the desired pressure in the vessel. If the material level reaches the mid-level indicator or high-level indicator, the amount of material flowing feeder is decreased to allow a constant flow of material out of the vessel into the conveying pipe.

The conveying line terminates at a scale hopper about 260 feet away. As the scale hopper fills, a weight is recorded by the PLC in 5-second intervals. The previous hopper weight is subtracted from the current weight, divided by 5, and multiplied by 60 to get an instantaneous lbs/min conveying rate. Data recorded includes pounds per minute conveying rate, conveying pressure, feeder speed, blower speed, ambient air temperature, and standard cubic feet per minute ("SCFM") of air being used to convey the material. This data is then transferred into a spreadsheet for calculation of material to air solids loading, terminal velocity, pick-up velocity, convey system air losses, and pound per minute average.

For the dilute phase system, ambient air enters about 30 feet of four-inch 11-gauge carbon steel tube to the inlet of a 30 HP blower with a PneuMax 6008 rotary pressure pump (Tuthill, Springfield, Mo.). The carbon steel tube includes a four-inch calibrated velocity meter (Rosemount Inc., Chanhassen, Minn.). The positive displacement blower discharge also includes a 0 to 30 psig pressure transmitter. Data from the air velocity flow meter and pressure transmitter is sent to the CompactLogix 1769 L35E programmable logic processor ("PLC") and Rockwell Software's RSLogix 5000 Enterprise edition (Rockwell Automation, Inc.) which receives and transmits the airflow and pressure to the user. The blower is controlled by an Allen Bradley Flex 40 VFD. It will be appreciated that in the commercial setting, the blower is typically manually adjusted. The control loop was provided in order to test various gas flow conditions in this experimental example.

Once air enters the blower, it is pressurized and pushed through about 30 feet of clean air pipe to the Smoot FT12 type 1 rotary feeder, which is controlled by the VFD. A 0-30 psig pressure transmitter (Rosemont, Chanhassen Minn.) is located along gas line to provide input to the PLC. Particulate material is feed into the conveying line by the FT12 rotary feeder from the hopper. Particulate material is then conveyed to a scale hopper about 260 linear feet away through the conveying line. Again, as the scale hopper fills, a weight is recorded by the PLC in 5-second intervals. The previous hopper weight is subtracted from the current weight, divided by 5, and multiplied by 60 to get an instantaneous pounds per minute conveying rate. Data recorded includes: pounds per minute conveying rate, conveying pressure, feeder speed, blower speed, ambient air temperature, and SCFM used to convey the material. This data is then transferred into a spreadsheet where it calculates material to air solids loading, terminal velocity, pick-up velocity, convey system air losses, and pound per minute average.

For the dense phase batch system, 10 ft$^3$ of particulate material is loaded into a scale hopper above the dense phase vessel. The vessel is a 12.5 ft$^3$ 70° bottom discharge vessel connected to an 40 HP Ingersoll-Rand air compressor with dual 1000-gallon air reservoirs. Air enters though a single 2-inch schedule-40 pipe connection where it passes through an orifice plate. Before and after the orifice plate is a 4 to 20 mA differential pressure gauge (Rosemont, Chanhassen Minn.) that provides an analog signal sent to the PLC, where it is converted to a digital signal and then scaled to provide the SCFM used for conveying the material. A globe valve controls the amount of air that can enter the vessel. The vessel is equipped with both a top air inlet or bottom air fluidizing inlets, depending on material. Each fluidizer is controlled by a manual ball valve. Material is discharged from the bottom of the vessel into 3-inch schedule-40 carbon steel pipe. As with the continuous dilute phase and the continuous semi-dense phase systems, the conveying line comprises 260 linear feet of pipe with seven 90° 36-inch center line radius elbows, four three-inch pipe slide diverters. The particulate material is conveyed through the carbon steel pipe into a scale hopper. As the scale hopper fills a weight is recorded by the PLC in 5-second intervals. The previous hopper weight is subtracted from the current weight, divided by 5, and multiplied by 60 to get an instantaneous pounds per minute conveying rate. Data recorded includes: pounds per minute conveying rate, conveying pressure, feeder speed, blower speed, ambient air temperature, and SCFM of air used to convey the material. This data is then transfer into a proprietary excel spreadsheet where it calculates material to air solids loading, terminal velocity, pick up velocity, convey system air losses, and pound per minute average.

From these three tests, all data was recorded for each material and analyzed. Since the conveying lines for the inventive continuous semi-dense phase system and the dilute phase systems have less cross sectional area than the dense phase system, the conveying rates, SCFM (air used to convey) and solids loading was scaled down using a mathematical formulas. The cross-sectional area of the tube was divided by the cross-sectional area of the pipe and a multiplier of 0.81 was used on the dense phase data to standardize all data. Furthermore, to calculate pounds of material per horsepower required, a standard set of parameters were used. The MD-Tuthill blower sizing program was used to determine horsepower and blower requirements for the dilute and semi-dense phase systems. In the program, the SCFM and pressure was inputted and altitude was set at a 1000 feet above sea level. From there the program listed the available blower configurations that could be used which each test. Blowers were chosen based on the cheapest possible while performing at no more than 85% of their working capacity. Once a blower model was chosen, the program gave the estimated horsepower requirements at operating level and at the brake horsepower level that a blower package would be sized and sold with. Then the average conveying rate per test was divided by the brake horsepower needed to calculate a pounds per horsepower ratio. The dense phase system was calculated by taking the SCFM used for conveying, multiplying that by 1.15, and dividing by 4.25 to calculate the compressor size needed to convey the material. Then 15% was added due to loss from ancillary equipment such as chillers and air purifiers. Then the average conveying rate per test was divided by the compressor horsepower needed to calculate a pounds per horsepower ratio.

For the continuous dilute phase system, three test system runs were investigated. The first was a "traditional" test run in which the system parameters were set to operate under conditions comparable to that in the field. The second test system run evaluated the conditions under which solids loading was maximized. In general, the gas velocity was reduced compared to that of the traditional test run. The final continuous dilute phase test run system evaluated the conditions under which the gas velocities were reduced to levels that were approaching a very unstable point.

For the dense phase system, two test system runs were investigated. The first was a "traditional" test run in which the system parameters were set to operate under conditions comparable to that in the field. The second dense test run system evaluated the conditions under which the pressure of the vessel was reduced those comparable to the inventive system. It will be appreciated that solids loading was significantly reduced. It will be appreciated that dense phase systems do not operate under such conditions in the commercial setting. These low-pressure systems were investigated only to provide comparative data to that of the present invention.

For the inventive system, one or more test system runs were investigated. For some materials, the first test system run was high velocity air system, while the second was a low velocity air system. The low velocity was that in which the gas velocities were reduced to levels as low as possible while still maintaining a stable flowable composition. For some test materials, an intermediate medium velocity test run was investigated.

The first material to be conveyed through the three test systems was a bentonite clay. The specifications on the bentonite clay, which had a bulk density of 49.4 lbs/ft³, are, set forth in Table 1A, and the results of the test run are set forth in Table 1B.

TABLE 1A

Particle Size of Bentonite Clay

| Micron Equiv. | Sieve No. | Mass Before | Mass After | Change in Mass | % Retained Each Sieve | % Retained Cumulative |
|---|---|---|---|---|---|---|
| 1180 | 16 | 621 | 621 | 0 | 0.0% | 0.0% |
| 600 | 30 | 609.5 | 609 | 0.5 | 0.5% | 0.5% |
| 300 | 50 | 551.5 | 551 | 0.5 | 0.5% | 1.0% |
| 150 | 100 | 346 | 342 | 4 | 4.0% | 5.0% |
| 75 | 200 | 513 | 498 | 15 | 14.9% | 19.8% |
| 32 | 450 | 441 | 377 | 64 | 63.4% | 83.2% |
| 15 PAN | | 391 | 374 | 17 | 16.8% | 100.0% |

34.9 Average Micron Size 101 gm sample size 1.82 Sgw (Standard Deviation)

TABLE 1B

Results Bentonite Clay

| Type | Pressure of Vessel (psi) | Rate of Solid Particulate Material (lb/min) | Gas Velocity (ft/min) | Loading (lb solid particulate material/ lb air) | lb/HP |
|---|---|---|---|---|---|
| Dilute Phase Test #1 (Traditional) | 12 | 194 | 5500 | 11.2 | 8.9 |
| Dilute Phase Test #2 (Optimal) | 12 | 303 | 3500 | 28.4 | 13.12 |
| Dilute Phase Test #3 (Bottom) | 11.7 | 284 | 3200 | 28 | 20.4 |
| Dense Phase Test #1 (Traditional) | 21 | 193 | 1800 | 97.5 | 9.77 |
| Dense Phase Test #2 (Bottom) | 12.6 | 121 | 2900 | 34 | 3.74 |
| Inventive Test #1 (low velocity) | 13 | 320 | 900 | 120 | 24 |
| Inventive Test #2 (high velocity) | 13 | 345 | 1700 | 65 | 22 |

The second material to be conveyed through the three test systems was a gypsum. The specifications on the gypsum, which had a bulk density of 62.5 lbs/ft³, are set forth in Table 2A, and the results of the test runs are set forth in Table 2B.

TABLE 2A

Particle Size of Gypsum

| Micron Equiv. | Sieve No. | Mass Before | Mass After | Change in Mass | % Retained Each Sieve | % Retained Cumulative |
|---|---|---|---|---|---|---|
| 1180 | 16 | 621 | 621 | 0 | 0.0% | 0.0% |
| 600 | 30 | 610 | 609 | 1 | 1.0% | 1.0% |
| 300 | 50 | 553 | 551 | 2 | 1.9% | 2.9% |
| 150 | 100 | 350 | 342 | 8 | 7.8% | 10.7% |
| 75 | 200 | 524 | 498 | 26 | 25.2% | 35.9% |
| 32 | 450 | 435 | 377 | 58 | 56.3% | 92.2% |
| 15 PAN | | 382 | 374 | 8 | 7.8% | 100.0% |

45.3 Average Micron Size 103 gm sample size 1.99 Sgw (Standard Deviation)

TABLE 2B

Test Results Gypsum

| Type | Pressure of Vessel (psi) | Rate of Solid Particulate Material (lb/min) | Gas Velocity (ft/min) | Loading (lb solid participate material/ lb air) | lb/HP |
|---|---|---|---|---|---|
| Dilute Phase Test #1 (Traditional) | 12 | 185 | 5300 | 11 | 7 |
| Dilute Phase Test #2 (Optimal) | 12 | 220 | 4000 | 17 | 12 |
| Dilute Phase Test #3 (Bottom) | 12 | 250 | 3000 | 25 | 13 |
| Dense Phase Test #1 (Traditional) | 20 | 300 | 2700 | 100 | 10 |
| Inventive Test #1 (low velocity) | 13 | 300 | 1300 | 50 | 17 |
| Inventive Test #2 (high velocity) | 13 | 270 | 3700 | 23 | 11 |

The third material to be conveyed through the three test systems was fly ash. The specifications on the fly ash, which had a bulk density of 55.0 lbs/ft³, are set forth in Table 3A, and the results of the test runs are set forth in Table 3B.

TABLE 3A

Particle Size of Fly Ash

| Micron Equiv. | Sieve No. | Mass Before | Mass After | Change in Mass | % Retained Each Sieve | % Retained Cumulative |
|---|---|---|---|---|---|---|
| 600 | 30 | 622 | 621 | 1 | 1.0% | 1.0% |
| 300 | 50 | 610 | 609 | 1 | 1.0% | 2.0% |
| 150 | 100 | 552 | 551 | 1 | 1.0% | 2.9% |
| 75 | 200 | 344 | 343 | 1 | 1.0% | 3.9% |
| 53 | 270 | 505 | 498 | 7 | 6.9% | 10.8% |
| 32 | 450 | 463 | 377 | 86 | 84.3% | 95.1% |
| 15 PAN | | 380 | 375 | 5 | 4.9% | 100.0% |

34.4 Average Micron Size 102 gm sample size 1.57 Sgw (Standard Deviation)

TABLE 3B

Results Fly Ash

| Type | Pressure of Vessel (psi) | Rate of Solid Particulate Material (lb/min) | Gas Velocity (ft/min) | Loading (lb solid particulate material/ lb air) | lb/HP |
|---|---|---|---|---|---|
| Dilute Phase Test #1 (Traditional) | 10.6 | 208.4 | 5400 | 12.5 | 10.63 |
| Dilute Phase Test #2 (Optimal) | 10.1 | 217.4 | 5000 | 14.2 | 12.43 |
| Dense Phase Test #1 (Bottom) | 11 | 209 | 1939 | 43.4 | 7.57 |
| Dense Phase Test #2 (Bottom) | 10 | 249 | 2013 | 40 | 8.93 |
| Inventive Test #1 (low velocity) | 11.1 | 264 | 1120 | 76 | 13.68 |
| Inventive Test #2 (intermediate velocity) | 11.6 | 241 | 2126 | 36.5 | 14.43 |
| Inventive Test #3 (high velocity) | 11.5 | 257 | 2600 | 32 | 12.24 |

While several "traditional" tests were attempted for the dense phase system, none of those tested at high pressures were able to successfully convey the fly ash material.

Another material to be conveyed through the three test systems was a 325-mesh limestone commercially available from Great Lakes Calcium (Great Bend, Wis.).

TABLE 4

325-Mesh Limestone

| Type | Pressure of Vessel (psi) | Rate of Solid Particulate Material (lb/min) | Gas Velocity (ft/min) | Loading (lb solid particulate material/ lb air) | lb/HP |
|---|---|---|---|---|---|
| Dilute Phase Test #1 (Traditional) | 11 | 156 | 5000 | 10 | 7 |
| Dilute Phase Test #2 (Optimal) | 11 | 205 | 3100 | 21 | 16 |
| Dense Phase Test #1 (Traditional) | 18 | 218 | 4000 | 52 | 5 |
| Dense Phase Test #2 (Bottom) | 17 | 203 | 2200 | 80 | 9 |
| Inventive Test #1 (low velocity) | 13 | 230 | 1500 | 50 | 16 |
| Inventive Test #2 (high velocity) | 12 | 206 | 2800 | 24 | 10 |

Another material to be conveyed through the three test systems was a 200-mesh limestone commercially available from Great Lakes Calcium (Great Bend, Wis.).

TABLE 5

200-Mesh Limestone

| Type | Pressure of Vessel (psi) | Rate of Solid Particulate Material (lb/min) | Gas Velocity (ft/min) | Loading (lb solid particulate material/ lb air) | lb/HP |
|---|---|---|---|---|---|
| Dilute Phase Test #1 (Traditional) | 11 | 137 | 6400 | 7 | 5.27 |
| Dilute Phase Test #2 (Optimal) | 11.1 | 220 | 4500 | 13 | 9 |
| Dense Phase Test #1 (Traditional) | 18 | 240 | 3685 | 94 | 4.65 |
| Dense Phase Test #2 (Bottom) | 16.5 | 204 | 1637 | 205 | 8.98 |
| Inventive Test #1 (low velocity) | 12.8 | 289 | 2550 | 37 | 14.5 |
| Inventive Test #2 (high velocity) | 11.4 | 235 | 1900 | 40 | 15.5 |

The foregoing test runs illustrate that the semi-dense phase conveying system of the present invention was able to achieve very high particulate material loading using low air velocities and low air pressures at a low capital and operating costs. In general, the solids loadings of the semi-dense phase conveying system were much higher than a traditional dilute phase system, and in many instances the solids loadings were comparable to those of a traditional dense phase systems. Because the physical equipment of a dilute phase conveying system and a continuous semi-dense conveying phase system are very similar, this increase in solids loading provides an increase in efficiency (lb/HP). Moreover, if a continuous semi-dense phase conveying system has solids loading that approach that of a traditional dense phase system, the continuous semi-dense phase conveying system has a higher efficiency (lb/HP) than a traditional dense phase system because the semi-dense system uses a conventional blower (15 prig maximum) instead of a high pressure air compressor. These efficiencies are achieved without the necessity of increased capital costs required for ASME-code equipment required for dense phase systems.

Is important to note that the dense phase system was capable of achieving higher loadings only by nearly doubling the pressure. When the pressure exceeds 14.9 psi, the equipment of such a system must be of a thicker construction and meet ASME code requirements. Further capital expenses with dense phase systems are incurred due to the high costs of the compressor (100 HP) required to generate the high pressure gas, as well as the increased cost of the high pressure rotary airlocks required to maintain the elevated pressures in the vessel. It is estimated that a typical dense phase system costs at least three times as much as a dilute phase system. Moreover, due to the energy required to operate the compressor, the dense phase system still has an overall efficiency well below that of the inventive system (9.77 vs 22-24 lbs of material/HP).

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to

What is claimed and desired to be secured by Letters Patent is as follows:

1. A continuous semi-dense phase conveying method for conveying a particulate material through a pneumatic conveying line comprising:

continuously feeding said particulate material from a feed source through a low pressure rotary airlock valve into a sealed vessel having a gas inlet, a particulate material inlet, and a gas and particulate material outlet, and wherein said vessel has a pressure therein during operation of about 15 psig or less;

continuously supplying gas into pressurizing gas supply line which branches into at least one feed gas line at least one bypass line; wherein said feed gas line provides pressurizing gas to said vessel at said gas inlet to form a gas and particulate material mixture and wherein said bypass line has a bypass control valve and is coupled to said pneumatic conveying line downstream from said gas and particulate material outlet at a point where a pressure in the pneumatic conveying line is measurably and substantially lower than said pressure in said vessel;

permitting said gas and particulate material mixture to continuously flow into said pneumatic conveying line, wherein said pneumatic conveying line is coupled to said gas and particulate material outlet of said vessel;

wherein said continuously feeding and said continuously supplying gas steps are performed without equipment meeting ASME code requirements.

2. The method of claim 1 further comprising the step of monitoring said pressure of said vessel and changing the flow of gas through said bypass line to said pneumatic conveying line to maintain said pressure in said vessel at a predetermined pressure.

3. The method of claim 1 wherein said feed gas line has a pressure transmitter which is coupled to a controller which controls the gas flow through said bypass control valve of said bypass line, and further comprising the step of providing a control signal to said bypass control valve from said controller to control the flow of gas through said bypass line.

4. The method of claim 1 wherein said pressurizing gas line has a pressure transmitter which is coupled to a controller which controls the gas flow through said bypass control valve of said bypass line, and further comprising the step of providing a control signal to said bypass control valve from said controller to control the flow of gas through said bypass line.

5. The method of claim 1 further comprising the step of providing purge gas to said rotary airlock from said pressurizing gas supply line through a purge gas line.

6. The method of claim 1 wherein said purge gas line gas line has a pressure transmitter which is coupled to a controller which controls the gas flow through said bypass control valve of said bypass line, and further comprising the step of providing a control signal to said bypass control valve from said controller to control the flow of gas through said bypass line.

7. The method of claim 1 wherein said step of continuously supplying gas into pressurizing gas supply line comprises blowing gas at a velocity of about 800 to 4000 ft/min into said pressurizing gas supply line.

8. The method of claim 1 wherein about 22 or more pounds of particulate material per horsepower used to power said pressurizing gas source is used source and a loading of at least 65 pounds of particulate material per pound of pressurizing gas is achieved when bentonite clay is used as a test particulate material moving through 260 feet of pipe as a test conveying line.

9. The method of claim 1 wherein one or more fluidizing gas lines are coupled to said bypass line and one or more fluidizing inlets on said vessel, and further comprising the step of continuously supplying gas to said vessel through said fluidizing gas lines and at least one of said fluidizing inlets.

10. The method of claim 9 wherein at least three fluidizing gas lines are coupled to said bypass line.

11. The method of claim 9 wherein said particulate material has an average particle size of 75 microns or smaller.

12. The method of claim 1 wherein said continuously supplying step is performed without a compressor or a high pressure rotary air lock, thereby providing a low capital cost of said conveying method compared to a dense phase conveying method.

13. The method of claim 1 wherein said method has an overall efficiency as measured in pounds of particulate material per horsepower that is higher compared to that of a dense phase conveying method.

* * * * *